United States Patent [19]

Campbell

[11] Patent Number: 5,201,930
[45] Date of Patent: Apr. 13, 1993

[54] PLANT GROWTH PRODUCT

[75] Inventor: William E. Campbell, Morehead City, N.C.

[73] Assignee: Aqua-10 Corporation, Beaufort, N.C.

[21] Appl. No.: 769,135

[22] Filed: Sep. 30, 1991

[51] Int. Cl.$^5$ ............................................. C05F 11/00
[52] U.S. Cl. .......................................... 71/23; 71/24; 71/64.1; 71/DIG. 2
[58] Field of Search ............... 71/23, 24, 28, 64.1, 71/DIG. 2

[56] References Cited

U.S. PATENT DOCUMENTS 3,630,710  12/1971  Frederickson .................... 71/23
3,912,490  10/1975  Boghosian ......................... 71/28
4,125,392  11/1978  Primo ............................. 71/23 X
4,459,149   7/1984  Moran et al. ...................... 71/24

FOREIGN PATENT DOCUMENTS 1136583  6/1986  Japan ............................. 71/23
2150552  7/1985  United Kingdom ............. 71/23

Primary Examiner—Ferris Lander
Attorney, Agent, or Firm—Olive & Olive

[57] ABSTRACT

A plant stimulant product prepared from seaweed, a method for preparation of said product, and methods of use of said product. The product contains oxygen derived from a peroxide and aloe and may also contain humic acid.

9 Claims, 1 Drawing Sheet

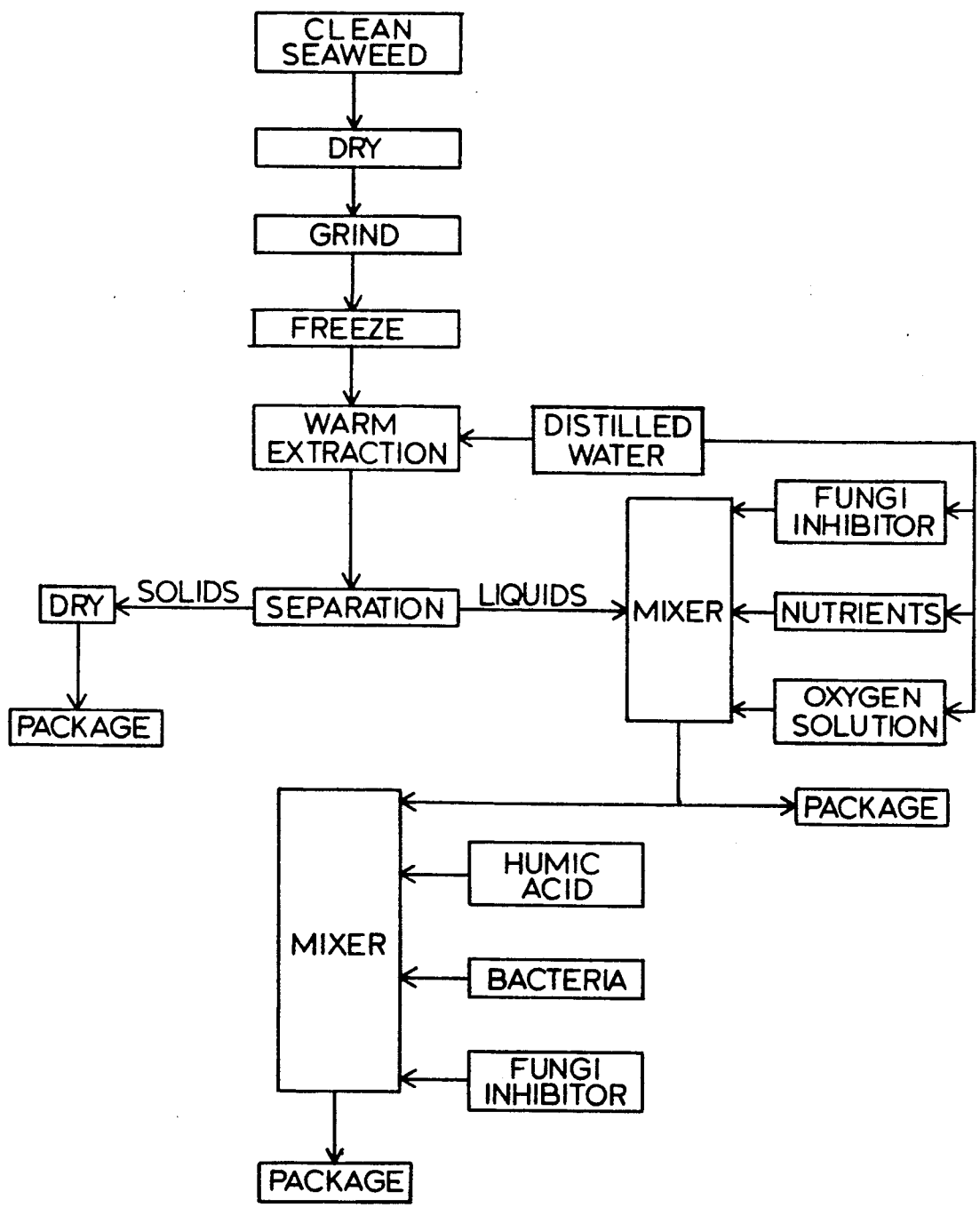

PLANT GROWTH PRODUCT

CROSS-REFERENCE TO RELATED APPLICATIONS

Another patent application entitled "Feed and Water Additive and Method of Making Same" is contemporaneously filed herewith.

BACKGROUND OF THE INVENTION

1. Field of the Invention

This invention relates to plant fertilizers and plant growth stimulants, and in particular pertains to a plant stimulant made from seaweed which contains oxygen.

2. Description of the Related Art

Seaweed has long served as a fertilizer for plants. When chemical fertilizers were developed, however, seaweed no longer was used in great amounts. As natural "organic" fertilizers have become increasingly popular, seaweed in the form of powder sprays and liquid applications has again become a commercially feasible fertilizer.

For example, solutions or meal made from the seaweed Ascophyllum nodosum have been found to cause plants such as flowers, grapes, tomatoes and soybeans to have improved quality, protein quantity and yield. Other seaweeds which are reported to improve plant growth include species Ascophyllum, Sargassum, Macrocystis, and Laminaria.

Seaweed in the order Fucales (brown algae) such as the genus Sargassum have not been used as fertilizer sources as much as the northern genera of the order Laminariales discussed above. Sargassum is found primarily in tropical or subtropical ocean regions and extends northward in the Atlantic Ocean into temperate regions.

The value of seaweed is generally attributed to the fact that various species are relatively low in carbohydrate and protein, and rich in numbers of amino acids, trace elements, B, D, E and other vitamins, fucoxanthin, and beta-carotene and various plant growth hormones.

The means of treatment with seaweed to improve plant growth include application to soil and seeds and foliar sprays to plants at varying times including as soon after leaf emergence as possible and at blossom. The seaweed may be blended with fungicides or other plant treatments.

Previous seaweed products have not always been uniformly effective in their content of the trace elements, and vitamins and other compounds and therefore, seaweed products do not always provide significant benefit to the plants exposed to the product.

Many soils in which plants are grown are lacking in oxygen which is essential for plant growth. In some soils such as heavy clay soils, the lack of oxygen completely or partially inhibits plant growth. This problem is addressed by the invention of Boghosian (U.S. Pat. No. 3,912,490), which provides a method for oxygenating roots by the addition of urea peroxide or hydrogen peroxide. The peroxides are added directly to the plants in solution. Boghosian also states, without example, that the peroxides may be encapsulated using polymeric materials such as ethylcellulose as a coating.

It is an object of this invention to provide an oxygen source as part of a seaweed fertilizer for plants.

Although seaweed can serve as a very complete plant nutrient, it does not generally have an optimum amount of organic carbon. It is therefore a further object of this invention to provide a seaweed fertilizer product that contains added humic acid as a carbon source.

Other objects and advantages will be more fully apparent from the following disclosure and appended claims.

SUMMARY OF THE INVENTION

The product of the invention is made of dried seaweed which is extracted to form a liquid plant stimulant product which contains an oxygen source. The seaweed product of the invention may also contain a humic acid source.

Other aspects and features of the invention will be more fully apparent from the following disclosure and appended claims.

BRIEF DESCRIPTION OF THE DRAWINGS

FIG. 1 is a schematic drawing of the method of making a plant stimulant and soil additive according to the invention.

DETAILED DESCRIPTION OF THE INVENTION AND PREFERRED EMBODIMENTS THEREOF

The present invention comprises a seaweed product, a method of making the seaweed product, and a method of applying the product to plants, soil and seeds.

The seaweed-containing product of the invention comprises a seaweed extract and oxygen and aloe. It may also comprise humic acid. A schematic diagram of the specific process of the invention is shown in FIG. 1.

The method of preparing a product from seaweed, generally comprises:

(a) obtaining dry, ground seaweed;
(b) freezing the dry, ground seaweed;
(c) suspending the dry, ground seaweed in water with agitation and warming to allow extraction of the seaweed;
(d) separating liquid from the suspension of extracted seaweed; and
(e) adding an oxygen-containing liquid, prepared from water, a peroxide and aloe.

The method of stimulating plants according to the invention, comprises:

(a) providing a seaweed-containing plant stimulant comprising:
    (i) a seaweed extract; and
    (ii) a peroxide and aloe; and
(b) applying said seaweed-containing plant stimulant to a selected object, said object selected from the group consisting of soil in which seeds or plants will be planted; soil where seeds or plants have been planted; leaves of plants; and seeds.

Whether the product of the invention is applied to leaves, seeds, soil or a combination thereof, there is an increase in plant yield and/or plant protein, sugar or other desired plant component in all the plants tested.

The amount of peroxide which may be used with a seaweed product may vary from about 0.1% to about 0.5% (weight percent). The source of peroxide may be, for example, hydrogen peroxide, urea peroxide or calcium peroxide. In a preferred product, the preferred ratio of hydrogen peroxide to seaweed product (weight/weight) is about 0.25%.

The preferred application rate of the seaweed extract product ranges from about 8 to about 32 oz per acre per application, with the preferred application rate varying depending on plant condition, whether the application is to soil, leaves, and the type of plant. The rate per application and the number of applications which may be used also varies with growing conditions such as soil type and fertility, temperature, and rainfall.

The features and advantages of the present invention will be more clearly understood by reference to the following examples, which are not to be construed as limiting the invention.

EXAMPLES

Example I Obtaining and Preparing the Seaweed Extract

This example describes a preferred method of preparing a basic seaweed product which may be used in the invention. The preferred seaweed used in the invention is Sargassum ("gulfweed") or other genera of the order Fucales, which are found primarily in tropical or subtropical regions.

Seaweed of the genus Sargassum, preferably S. natan or S. fluitan, or other Phaeophyta, is harvested by known means from known beds in the Atlantic Ocean off Beaufort, N.C. Floating, detached beds approximately 40-200 miles out have been found to provide acceptable seaweed. The wet seaweed is cleared from foreign matter such as shells, ropes, bottles and other detritus and is placed on drying racks to dry in the sun. When the moisture content of the seaweed is no greater than about 14%, which generally takes 2-8 days, the seaweed is ground to a powder using a Fitzmil Model D Comminuting Machine (W. J. Fitzpatrick Co., Chicago, Ill.). The powder may be about 10 to 60 mesh and is preferably about 60 mesh.

The dried, ground seaweed is chilled to a temperature substantially below the freezing point of water. Preferably it is chilled to a temperature of about $-100°$ F. and frozen for 5-20 minutes using gaseous $N_2$ evaporating from liquid nitrogen as the cryogenic substance and circulating the cold gaseous $N_2$ through the powder. This freezing causes cellular rupture and better release of contents during subsequent extraction.

The ground seaweed is weighed and added to a tank having a blending agitator in the tank and having water-containing coils for temperature adjustment. Distilled water is added to a final volume so that the seaweed is in a ratio of about 1 lb seaweed powder to 22-176 lbs added water (wt/wt). When about half of the final volume of water has been added, the agitator and the heating coils are turned on so that water at a temperature equal to about 103° F. is circulated through the coils. After the remaining water is added to the seaweed, and the temperature of the seaweed slurry reaches a desired final temperature of about 100°-170° F., and preferably about 103°, the temperature is maintained there. The slurry is agitated continuously, preferably for about 50-200 hours and most preferably for about 120 hours. The length of time of extraction at the warm temperature affects the amount of cytokinin, amino acid and other components extracted from the seaweed.

Solids are separated from the liquid extract through a 60 mesh shaker screen (the treatment of the solids is found in Example VIII). The liquid extract flows into a blending tank. Formaldehyde may be added at this point in a volume such that the final concentration per volume is about 0.1% of a 37% formaldehyde solution (wt/wt). The formaldehyde is at a very low level, and serves as a preservative. Alternate preservatives may be used.

After agitation of the extract with the formaldehyde for about 12 hours, a prepared solution of elements is added with continued agitation at a ratio of 0.2 to 1.8% and preferably about 1.2% by volume. Table I shows the amount of each compound or a solution of each compound to add to make 1 ton (2,000 lbs) of elemental solution to use to add to the extract.

TABLE I

| Compound | Weight Added | Added Weight Percent |
|---|---|---|
| 8% Manganese Sulfate | 250.0 lbs. | 12.50% |
| 25% Copper Sulfate | 9.6 lbs. | 0.48% |
| 20% Iron Sulfate | 12.0 lbs. | 0.60% |
| 12.3% Zinc Sulfate | 617.9 lbs. | 30.89% |
| 20.5% Sodium Boron (Solabar) | 24.4 lbs. | 1.22% |
| 36% Sodium Molybdate | 1.4 lbs. | .07% |
| Citric Acid | 303.6 lbs. | 15.18% |
| Water | 781.0 lbs. | 39.05% |

The final concentration of the individual trace elements in the elemental solution is: soluble manganese (Mn), 1.00%; chelated copper (Cu), 0.12%; chelated iron (Fe), 0.12%; chelated zinc (Zn), 3.80%; boron (B), 0.25% and molybdenum, 0.025%.

Example II—Preparation of Oxygen-Containing Liquid (Oxygen Base)

An Oxygen Base (500 gallons) is prepared according to the formulation and in the order shown in Table II.

TABLE II

| Ingredient | Amount | When and How Added |
|---|---|---|
| Distilled $H_2O$ | 200 gallons | Initially |
| Potassium Stannate | 1000 cc | Add to $H_2O$ and agitate continuously |
| Distilled $H_2O$ | 200 gallons | Add 60 min. after potassium stannate and agitate continuously |
| Hydrogen Peroxide (50%) or other peroxide | 50 gallons | Add immediately after second water addition; agitate continuously |
| Aloe Concentrate | 50 gallons | Add immediately after $H_2O_2$; agitate continuously |
| Potassium Sorbate | 0.2% wt/wt (0.05-0.3%) | Add after aloe; agitate |
| Lactobacillus acidophilus (frozen concentrate) | 125 ml | Add 60 min. after potassium sorbate |

Aloe concentrate may be obtained from Vera Products, Inc., (Harlingen, Tex.). Lactobacillus acidophilus, which is preferably added to the Oxygen base, may be obtained from Miles Laboratories, Inc. (Madison, Wis.). The Oxygen Base as prepared above is a clear liquid and may be stored in sealed drums for use as needed as in Example III.

The peroxide serves as the source of oxygen. The potassium stannate is added to the Oxygen Base to stabilize the oxygen. The aloe concentrate has the unexpected effect of stabilizing the oxygen from the $H_2O_2$ in the product and of keeping the oxygen from "flashing off" during prolonged storage or when using the product as a soil or foliar treatment. The potassium sorbate is an antifungal substance and serves to inhibit fungi and yeast. Alternatively other antifungal substances, for example, sodium propionate, sodium formate, propionic acid, or formic acid, may be used at a similar concentration. Addition of a Lactobacillus culture serves to help in competitively excluding unwanted bacteria.

Example III—Adding Oxygen to Seaweed Extract

The Oxygen Base of Example II is added to the final extract of Example I after about 12 hours of continuous agitation (following element addition) at a concentration of about 2-10%, and preferably about 5%, by volume. The product of this Example III thus contains the peroxide component, such as $H_2O_2$, at a concentration of about 1-5%, preferably about 2.5%. The mixture is agitated for 360 minutes. The product having the extract of Example I plus Oxygen Base may be used for foliar application to plants.

Table III shows the formulations of various embodiments of the seaweed extract of the invention. These formulations are examples only and are not meant to be limiting in the various combination of components and processing parameters that may be used.

TABLE III

| Formulation 1 | |
|---|---|
| Seaweed, dried and ground | 1 lb. |
| Distilled water | 30 lbs. |
| Time of agitation at about 100° F. | 50 hrs. |
| Elemental solution (% volume added) | 1% |
| Formulation 2 | |
| Same as Formulation 1, plus 3% Oxygen Base | |
| Formulation 3 | |
| Same as Formulation 1, plus 5% Oxygen Base | |
| Formulation 4 | |
| Same as Formulation 1, plus 10% Oxygen Base | |
| Formulation 5 | |
| Seaweed, dried and ground | 1 lb. |
| Distilled water | 44 lbs. |
| Time of agitation at about 103° F. | 120 hrs. |
| Elemental solution (% volume added) | 1.2% |
| Formulation 6 | |
| Same as Formulation 5, plus 3% Oxygen Base | |
| Formulation 7 | |
| Same as Formulation 5, plus 5% Oxygen Base | |
| Formulation 8 | |
| Same as Formulation 5, plus 10% Oxygen Base | |
| Formulation 9 | |
| Seaweed, dried and ground | 1 lb. |
| Distilled water | 150 lbs. |
| Time of agitation at about 115° F. | 100 hrs. |
| Elemental solution (% volume added) | 1.8% |
| Formulation 10 | |
| Same as Formulation 9, plus 10% Oxygen Base | |
| Formulation 11 | |
| Seaweed, dried and ground | 1 lb. |
| Distilled water | 44 lbs. |
| Time of agitation at about 103° F. | 120 hrs. |
| No Elemental Solution | |
| Formulation 12 | |
| Same as Formulation 11, plus 5% Oxygen Base | |
| Formulation 13 | |
| Same as any one of the above formulations, plus 8% humic acid extract (by volume). See Example IV below. | |
| Formulation 14 | |
| Same as any one of the above formulations, plus 28% humic acid extract (by volume). See Example IV below. | |
| Formulation 15 | |
| Same as any one of the above formulations, plus 58% humic acid extract (by volume). See Example IV below. | |
| Formulation 16 | |
| Same as any one of the above formulations, plus a suspension of microorganisms having beneficial characteristics under environmental conditions. See Example IV below. | |

Example IV—Preparation of a Seaweed Product Containing Humic Acid

The product of any of Formulations 1-12 of Example III is placed in a tank. Peat extract, preferably a mild acid extract of the humic substances found in peat, (hereafter called humic acid) such as PHS 12 (obtained from Prodex TM, Ravenna, Ohio) is added to the tank at a percentage of about 8-58% of the product volume. The preferred percentage is about 20-30%. The mixture is agitated for about twelve hours. This results in Formulations 13-15. A preferred humic acid is prepared according to U.S. Pat. No. 4,459,149, the disclosure of which is incorporated herein. Alternatively, or in addition, a coal product prepared from ground, chemically treated coal, may be used.

Optionally a bacterial mix containing the most or all of the bacteria and other components in Table IV is added to the mixture. This mixture includes microorganisms which have known beneficial characteristics under particular environmental conditions, including breaking down organic compounds such as carbohydrates, proteins, and fats, reducing or fixing nitrogen compounds and producing plant growth compounds. A preferred microorganism additive is AGTX-7CF (POLYBAC, Allentown, Pa.). This is a product containing the bacteria listed in Table IV and is added at a concentration of about 0.02% to about 0.4%. After another hour of agitating, from about 0.05% to about 0.3% potassium sorbate (or other antifungal substance) is added. The mixture is agitated for 24 hours. This results in any one of the formulations included within Formulation 16.

TABLE IV

*Bacillus subtilis*
*Bacillus megaterium*
*Bacillus thuringiensis*
*Bacillus cereus*
*Pseudonomas fluorescens*
Azotobacter sp.
*Azotobacter vinelandii*
Mircococcus sp.
*Rhizobium japonicum*
*Rhizobium leguminosarum*
*Aspergillus oryzae*
Lactobacillus sp.
Nutrients The humic acid-containing seaweed extract may be used for foliar application, for soil application prior to planting, at, or after planting and for application to seeds prior to or at planting.

Example V—Soil Application

For trickle or band spray in a row of soil where seeds or seedlings are planted, the seaweed extract with or without the humic acid and/or bacterial additions of Example IV is diluted in water or liquid fertilizer in a ratio of about 3:1 to about 1:1 (oz extract:gallon water or other diluent). The rate of application is preferably about 12-24 oz of extract per acre.

For a broadcast spray to the soil, the dilution is in a ratio of from about 0.36:1 to about 6.5:1 (oz extract:gallon diluent), and the rate of application is preferably about 18-32 oz of extract per acre.

Example VI—Foliar Application

For spray application of the seaweed extract to plant leaves, the product of the invention, preferably with added humic acid and bacteria is preferably diluted in water in a ratio of about 1:2 to 8:1 (oz extract:gallon water). The rate of application may be 8-32 oz, and preferably is about 12-24 oz of extract per acre.

For legumes, plants in the squash family, tomatoes, potatoes and other dicot field vegetable and fruit crops, the foliar spray is preferably applied three times; at 4"-10" height, at early bloom, and at early fruit stage.

For monocots such as corn, wheat and rice, there are preferably foliar applications at 4"-10" height, at first signs of silk or heading, and 4-7 days after the second application.

For field leaf and root crops such as beets, cabbage and asparagus, foliar applications are preferably made at 3"-4" growth and at 10-14 day intervals thereafter.

For fruit trees and grapes, there are also preferably three applications spread between new leaf or early bloom stage to early fruit stage.

The product of the invention may also be used in transplant water or plant bed foliar spray.

Foliar sprays may also be applied to crops during times of plant stress using about 16 oz product extract per mixed with 3-25 gallons water, with a repeat spray about 7-10 days later.

Example VII

In this example and in Examples VIII-XII, the plants are grown under standard field conditions for that type of plant. Results are given for one set of trials for each type of plant. This example describes results of application of the seaweed product to alfalfa plants according to Example VI. There is an increase in protein from the 7.5% of the controls to 10.57% in the alfalfa plants treated with stimulant. This is about a 39% increase in protein content.

Example VIII

This example describes results of application of the seaweed product to cucumber plants according to Example VI. Application of the stimulant of the invention results in a doubling of the number of times the cucumbers may be picked, from 3 pickings, in the control plot, to 6 pickings in the treated plot.

Example IX

This example describes results of application of the seaweed product to tomato plants according to Example VI. Control tomato plantings in South Carolina coastal areas produce about 18,750 lb/acre, while plants given the stimulant product at least about 21,500 lb/acre. This is about a 15% increase in yield.

Example X

This example describes results of application of the seaweed product of the invention to green peppers according to Example VI. Control yield is 9500 lb/acre and plants treated with the product yield about 12,000 lb/acre, about a 26% increase in harvest poundage.

Example XI

This example describes results of application of the seaweed product of the invention to cotton. Control plants yield about 827 lb/acre while treated plants yield about 1000 lb/acre.

Example XII

This example describes results of application of the seaweed product of the invention to peanuts in Georgia. Control plants yield about 3811 lb/acre while treated plants yield about 4248 lb/acre. This yield difference is roughly equivalent to an increase of $100/acre in value of the crop.

Example XIII

This example describes how solids separated from the liquid extract in Example I are made into a useful by-product. The solids are placed on a screen or conveyor belt and are exposed to a hot air blower to remove moisture until it has a dry granular texture and is sufficiently dry to be packaged. After drying, the solids are packaged in bags or are sold in bulk for use as a dried plant stimulant product and as a feed supplement for livestock and poultry.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A seaweed-containing plant stimulant product, comprising:
   (a) an extract of seaweed obtained by a process comprising freezing a dried seaweed powder to cause cellular rupture and retain biological activity, and warming said extract to allow extraction of the seaweed, wherein about 1 lb of dried seaweed is added to about 22-176 lb of water to prepare said extract; and
   (b) an oxygen-containing liquid prepared from a peroxide and aloe, containing about 10% aloe and about 10% peroxide by volume, wherein the peroxide comprises about 0.25% of the product.

2. A seaweed-containing plant stimulant product according to claim 1, further comprising about 0.2 to about 1.8% of a trace element solution containing about 1% soluble manganese, 0.12% chelated copper, 0.12% chelated iron, 3.8% zinc, 0.25% boron and 0.025% molybdenum, a stannate compound at a concentration of about 1000 stannate per 500 gallons oxygen-containing liquid, and a sorbate compound at a concentration of about 0.2% by weight of the oxygen-containing liquid.

3. A seaweed-containing plant stimulant product according to claim 1, further comprising a humic acid extract at a volume of about 8-58% of the product volume.

4. A seaweed-containing plant stimulant product according to claim 1, wherein the peroxide is hydrogen peroxide.

5. A method of preparing a plant stimulant product from seaweed, comprising:
   (a) obtaining dry, ground seaweed;
   (b) freezing the dry, ground seaweed to rupture the seaweed cells and retain biological activity;
   (c) suspending the dry ground seaweed in water with agitation and warming to allow extraction of the seaweed, wherein about 1 lb of dried seaweed is added to about 22-176 lb of water to prepare a seaweed extract;
   (d) separating liquid from the suspension of extracted seaweed; and (e) adding an oxygen-containing liquid to the separated liquid of step (d), prepared from water, a peroxide and aloe, said oxygen-containing liquid containing about 10% aloe and about 10% peroxide by volume, said peroxide comprising about 0.25% of the product.

6. A method of preparing a plant stimulant product according to claim 5, further comprising agitating the liquid with formaldehyde at a concentration of about 0.1% to 37% by volume, and adding about 0.2 to about 1.8% of a trace element solution containing about 1% soluble manganese, 0.12% chelated copper, 0.12% chelated iron, 3.8% zinc, 0.25% boron and 0.025% molybdenum.

7. A method of preparing a plant stimulant product according to claim 5, further comprising adding a humic acid extract to the product at a volume of about 8-58% of the product volume.

8. A method of stimulating plants, comprising:
(a) providing a seaweed-containing plant stimulant product comprising:
(i) a seaweed extract prepared by freezing a dried seaweed powder to cause cellular rupture and retain biological activity and warming said extract to allow extraction of the seaweed, wherein about 1 lb of dried seaweed is added to about 22-175 lb of water to prepare said extract; and
(ii) an oxygen-containing liquid prepared from distilled water, a peroxide and aloe, said oxygen-containing liquid containing about 10% aloe and about 10% peroxide by volume, said peroxide comprising about 0.25% of the product; and
(b) applying said seaweed-containing plant stimulant product to a selected object, said object being selected from the group consisting of (i) soil in which seeds or plants will be planted; (ii) soil where seeds or plants have been planted; (iii) leaves; and (iv) seeds.

9. A method of stimulating plants according to claim 8, wherein the seaweed-containing plant stimulant product further comprises a humic acid extract at a volume of about 8-58% of the product volume.

* * * * *